(12) United States Patent
Wang

(10) Patent No.: US 11,307,384 B2
(45) Date of Patent: Apr. 19, 2022

(54) LENS

(71) Applicant: AAC Technologies Pte. Ltd., Singapore (SG)

(72) Inventor: Hailong Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 361 days.

(21) Appl. No.: 16/528,666

(22) Filed: Aug. 1, 2019

(65) Prior Publication Data

US 2020/0041764 A1    Feb. 6, 2020

(30) Foreign Application Priority Data

Aug. 6, 2018    (CN) .......................... 201821260524.4

(51) Int. Cl.
  *G02B 7/02*    (2021.01)
  *G02B 13/00*    (2006.01)
  *H04N 5/225*    (2006.01)

(52) U.S. Cl.
  CPC ....... *G02B 13/0015* (2013.01); *H04N 5/2254* (2013.01)

(58) Field of Classification Search
  CPC ...... G02B 13/0015; G02B 7/022; G02B 7/02; H04N 5/2254
  See application file for complete search history.

(56) References Cited

U.S. PATENT DOCUMENTS

2019/0064395 A1*   2/2019   Chou ..................... G02B 7/021

* cited by examiner

*Primary Examiner* — Joseph P Martinez
(74) *Attorney, Agent, or Firm* — W&G Law Group

(57) ABSTRACT

The present disclosure provides a lens. The lens includes: an optical portion at a central position; and a bearing portion surrounding the optical portion. The bearing portion includes a first surface, a second surface opposite to the first surface, and a connection surface connecting the first surface with the second surface. The first surface is provided with a first arc surface and a first planar surface. An intersection line between the first arc surface and the first planar surface is a first feature circle for measuring an interfacial decenter. The second surface is provided with a second arc surface and a second planar surface. An intersection line between the second arc surface and the second planar surface is a second feature circle for measuring the interfacial decenter. A radius of the first feature circle is not equal to a radius of the second feature circle.

3 Claims, 3 Drawing Sheets

LENS

TECHNICAL FIELD

The present disclosure relates to the field of optical imaging technologies, and in particular, to a lens.

BACKGROUND

With the continuous development of technology, electronic devices become more and more intelligent. In addition to digital cameras, portable electronic devices such as tablet PC and mobile phones are also equipped with lens modules to meet the users' requirements to take pictures at any time. In the related art, a lens module includes a plurality of lenses that are abutted against and fixed with each other.

The inventors have found that at least the following problems exist in the related art. In a manufacturing process for the lens of the lens module, a rounded transition is usually applied at a position where a surface intersects with another surface and a sharp corner is formed. However, the rounded structure may cause the lens to have no clear decenter to measure a feature circle, so that the measurement of the interfacial decenter is inaccurate during the subsequent assembly of the lens, thereby resulting in poor optical performance of the lens module.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
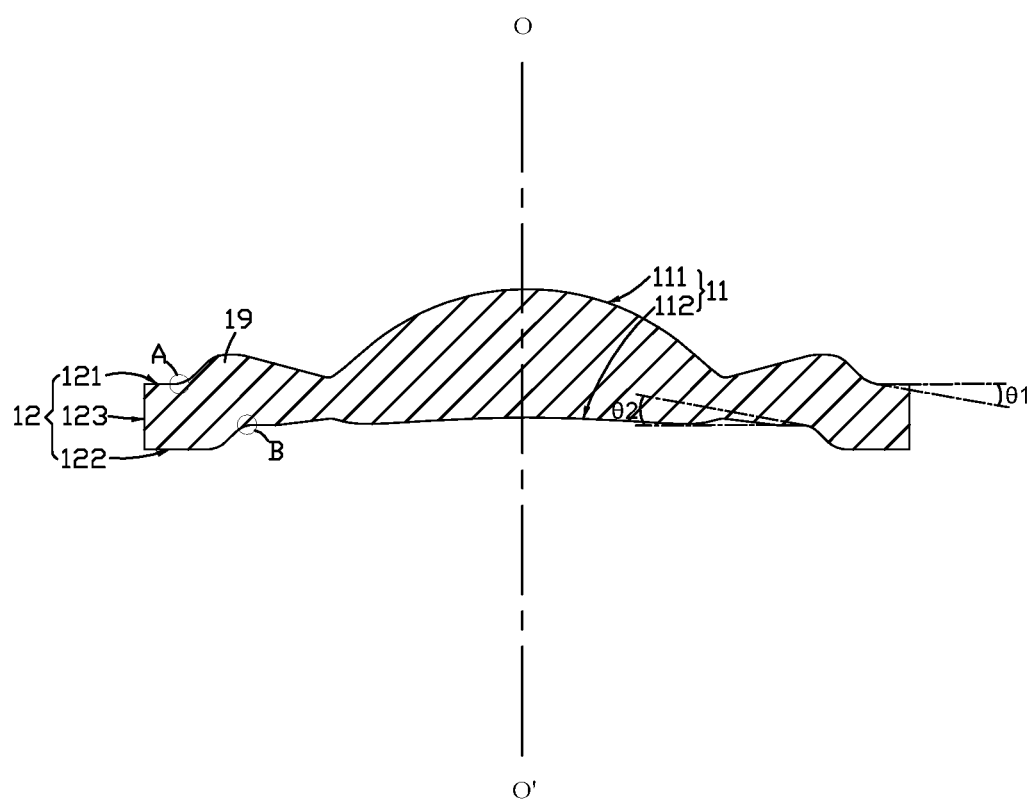
FIG. 1 is a cross-sectional schematic structural view of a lens according to a first embodiment of the present disclosure.
Figure 2:
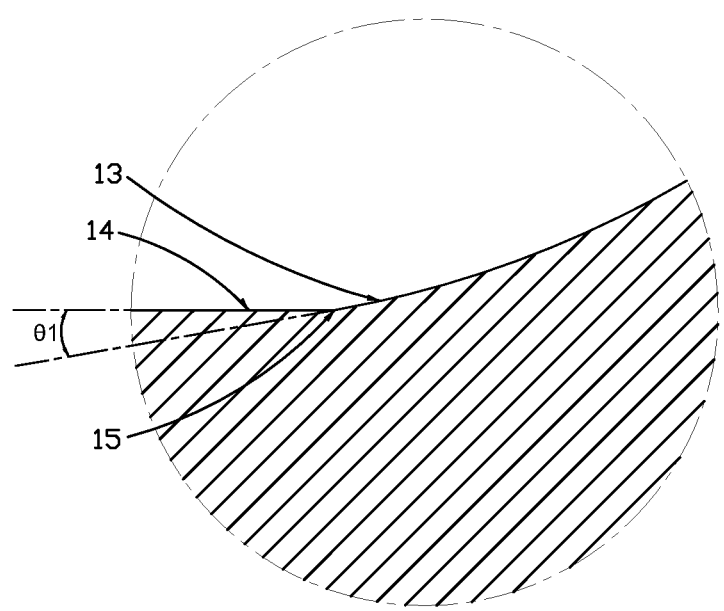
FIG. 2 is a partial enlarged view of a portion A in FIG. 1.
Figure 3:
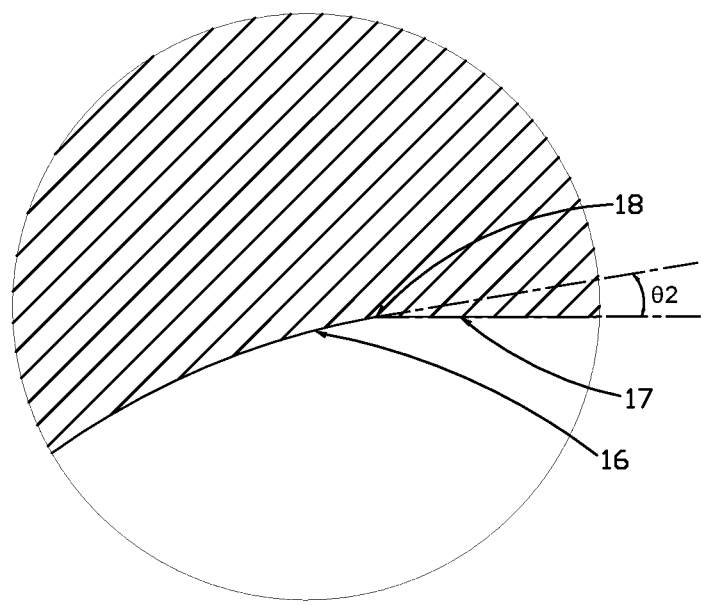
FIG. 3 is a partial enlarged view of a portion B in FIG. 1.

A first embodiment of the present disclosure provides a lens 100. As shown in FIGS. 1 to 3, the lens 100 includes: an optical portion 11 located at a central position, and a bearing portion 12 surrounding the optical portion 11. The bearing portion 12 includes a first surface 121, a second surface 122 opposite to the first surface 121, and a connection surface 123 connecting the first surface 121 with the second surface 122. The first surface 121 is provided with a first arc surface 13 and a first planar surface 14. An intersection line between the first arc surface 13 and the first planar surface 14 is a first feature circle 15 for measuring the interfacial decenter. The second surface 122 is provided with a second arc surface 16 and a second planar surface 17. An intersection line between the second arc surface 16 and the second planar surface 17 is a second feature circle 18 for measuring the interfacial decenter. A radius of the first feature circle 15 is not equal to that of the second feature circle 18.

Compared with the related art, the radius of the first feature circle 15 is not equal to that of the second feature circle 18, so that during a process of assembling the lens 100, the first feature circle 15 and the second feature circle 18 can be found when light is radiated into the lens 100. The interfacial decenter of the lens 100 can be measured by measuring a distance between the first feature circle 15 and the second feature circle 18. The first surface 121 is provided with the first arc surface 13 and a first planar surface 14, and the intersection line between the first arc surface 13 and the first planar surface 14 forms a sharp angle, which can more accurately determine the clear first feature circle 15 for measuring the interfacial decenter. Similarly, the second surface 122 is provided with the second arc surface 16 and a second planar surface 17, and the intersection line between the second arc surface 16 and the first planar surface 17 forms a sharp angle, which can more accurately determine the clear second feature circle 18 for measuring the interfacial decenter. Compared with the rounded transition structure, this can avoid the inaccurate measurement of the interfacial decenter caused by the inaccurate determination of the first feature circle 15 and the second feature circle 18, thereby greatly improving the optical properties of the lens module.

In this embodiment, the lens 100 is made of a glass material. The glass lens 100 has a better light transmittance up to 99%, thereby improving the imaging quality of the lens module. The lens 100 is not easy to be yellowed for a long time, thereby having a long service life. The glass lens 100 has a high hardness, thereby resulting in a good abrasion resistance. The existing glass lens 100 requires a rounded transition at a sharp position due to the requirements of the mold processing, so that it is difficult to find the interfacial decenter measuring circle of the glass lens 100. In this embodiment, because the intersection line between the arc surface and the planar surface is a feature circle for measuring the interfacial decenter, a clear feature circle for measuring the interfacial decenter can be determined, thereby improving the accuracy of the interfacial decenter measurement. In addition, in an injection molding process of the plastic lens 100, a rounded transition is also performed applied a sharp corner position in order to facilitate demolding and reduce the stress of the lens 100, so that it is also difficult to find the interfacial decenter measuring circle of the glass lens 100. Therefore, this structure according to the present embodiment is also applicable to the plastic lens 100.

Optionally, a first angle $\theta_1$ between a tangent plane of the first arc surface 13 at the first feature circle 15 and the first planar surface 14 is smaller than or equal to 10°. Further, a second angle $\theta_2$ between a tangent plane of the second arc surface 16 at the second feature circle 18 and the second planar surface 17 is smaller than or equal to 10°. In this way, a demolding performance of the lens 100 can be balanced, thereby ensuring the reliability of the lens module and facilitating mass production.

It should be noted that the optical portion 11 includes an object-side surface 111 close to the object side and an image-side surface 112 opposite to the object-side surface 111. The first surface 121 is further provided with a first protruding portion 19 which is arc-connected to the object-side surface 111, thereby ensuring the thickness of the edge of the lens 100 and facilitating mass production.

The above are only preferred embodiments of the present disclosure. Here, it should be noted that those skilled in the art can make modifications without departing from the inventive concept of the present disclosure, but these shall fall into the protection scope of the present disclosure.

What is claimed is:

1. A lens, comprising:
an optical portion at a central position; and
a bearing portion surrounding the optical portion,
wherein the bearing portion comprises a first surface, a second surface opposite to the first surface, and a connection surface connecting the first surface with the second surface; the first surface is provided with a first arc surface and a first planar surface; an intersection line between the first arc surface and the first planar surface is a first feature circle for measuring an interfacial decenter; the second surface is provided with a second arc surface and a second planar surface; an intersection line between the second arc surface and the second planar surface is a second feature circle for measuring the interfacial decenter; a radius of the first feature circle is not equal to a radius of the second feature circle, wherein a first angle between a tangent plane of the first arc surface at the first feature circle and the first planar surface is smaller than or equal to 10° and a second angle between a tangent plane of the second arc surface at the second feature circle and the second planar surface is smaller than or equal to 10°.

2. The lens as described in claim 1, wherein the lens is made of glass.

3. The lens as described in claim 1, wherein the optical portion comprises an object-side surface close to an object side and an image-side surface opposite to the object-side surface, and the first surface is further provided with a first protruding portion arc-connected to the object-side surface.

* * * * *